(12) United States Patent
Bradfield et al.

(10) Patent No.: US 8,723,380 B2
(45) Date of Patent: May 13, 2014

(54) STARTER MOTOR INCLUDING A CONDUCTOR MOUNTING ELEMENT

(75) Inventors: Mike Bradfield, Anderson, IN (US); Eric Babb, Anderson, IN (US); Todd Wright, Alexandria, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 360 days.

(21) Appl. No.: 13/342,502

(22) Filed: Jan. 3, 2012

(65) Prior Publication Data

US 2013/0169084 A1 Jul. 4, 2013

(51) Int. Cl.
*H02K 11/00* (2006.01)
(52) U.S. Cl.
USPC ............................................. 310/71; 310/85
(58) Field of Classification Search
USPC ...................... 310/71, 85, 89, 68 D
See application file for complete search history.

(56) References Cited

U.S. PATENT DOCUMENTS

| | | | | |
|---|---|---|---|---|
| 2,516,916 A | * | 8/1950 | Richards et al. | 136/256 |
| 3,850,501 A | * | 11/1974 | Butterfield et al. | 439/196 |
| 4,241,152 A | * | 12/1980 | Klink | 429/181 |
| 4,362,351 A | | 12/1982 | Wible | |
| 5,229,675 A | * | 7/1993 | Gotoh | 310/71 |
| 5,969,458 A | | 10/1999 | Yumiyama et al. | |
| 5,977,669 A | * | 11/1999 | Yoshida et al. | 310/68 D |
| 2002/0047360 A1 | * | 4/2002 | Kaizu | 310/68 D |
| 2005/0218733 A1 | | 10/2005 | Gandrud | |
| 2008/0084129 A1 | * | 4/2008 | Utsunomiya et al. | 310/71 |
| 2009/0027147 A1 | * | 1/2009 | Andoh | 335/196 |

FOREIGN PATENT DOCUMENTS

EP 0874416 B1 2/2002
KR 1020020079335 A 10/2002

OTHER PUBLICATIONS

International Search Report and Written Opinion for PCT Application No. PCT/US2012/068953, dated Mar. 29, 2013, pp. 1-8.

* cited by examiner

*Primary Examiner* — Thanh Lam
(74) *Attorney, Agent, or Firm* — Cantor Colburn LLP

(57) ABSTRACT

A starter motor including a frame having a terminal mounting portion, and a field fixedly mounted relative to the frame. An armature is rotatably supported relative to the field. A conductor having a terminal mounting section is electrically connected to one of the field and the armature. A terminal extends through the terminal section of the conductor and the terminal mounting portion of the frame. The terminal includes a plurality of threads. A conductor mounting element threadably engages with the plurality of threads. The conductor mounting element is configured to form a threaded clamped connection that establishes a solid metal compressive stack up connection between the conductor and the terminal.

10 Claims, 4 Drawing Sheets

US 8,723,380 B2

STARTER MOTOR INCLUDING A CONDUCTOR MOUNTING ELEMENT

BACKGROUND OF THE INVENTION

Exemplary embodiments pertain to the art of electric machines and, more particularly, to a starter motor having a conductor mounting element.

Electric machines generally include a frame, a field mounted to the frame, and an armature rotatably mounted relative to the field. When operating as a motor, the armature rotates in response to an electric current flow. In contrast, when operating as a generator, electric voltage is induced in the field per Faraday's Law. In the case of permanent magnet (PM) machines current would not flow through the field. Regardless, DC current must still be fed from outside the machine to the armature and brush rigging. Accordingly, the electric machine includes a terminal mounted to, and insulated from, the frame. The terminal provides a connection point for an external power conductor that carries electricity to (motor) or from (generator) the electric machine. The terminal is welded to a field coil strap that is electrically coupled to the field. After being welded to the field coil strap, the terminal is passed through and attached to the frame. The terminal is insulated from the frame using a non-metallic electrical insulator bushing or the like.

BRIEF DESCRIPTION OF THE INVENTION

Disclosed is a starter motor including a frame having a terminal mounting portion, and a field fixedly mounted relative to the frame. An armature is rotatably supported relative to the field. A conductor having a terminal mounting section is electrically connected to one of the field and the armature. A terminal extends through the terminal mounting section of the conductor and the terminal mounting portion of the frame. The terminal includes a plurality of threads. A conductor mounting element threadably engages with the plurality of threads. The conductor mounting element is configured to form a threaded clamped connection that establishes a solid metal compressive stack up connection between the conductor and the terminal.

Also disclosed is a method of providing an electrical terminal on an automotive starter motor. The method includes passing a terminal having a head portion through a terminal receiving opening formed in a conductor, attaching a conductor mounting element to the terminal to compress the conductor onto the head portion, passing the terminal through an opening formed in a frame of the automotive starter motor, and mounting the terminal to the automotive starter motor.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
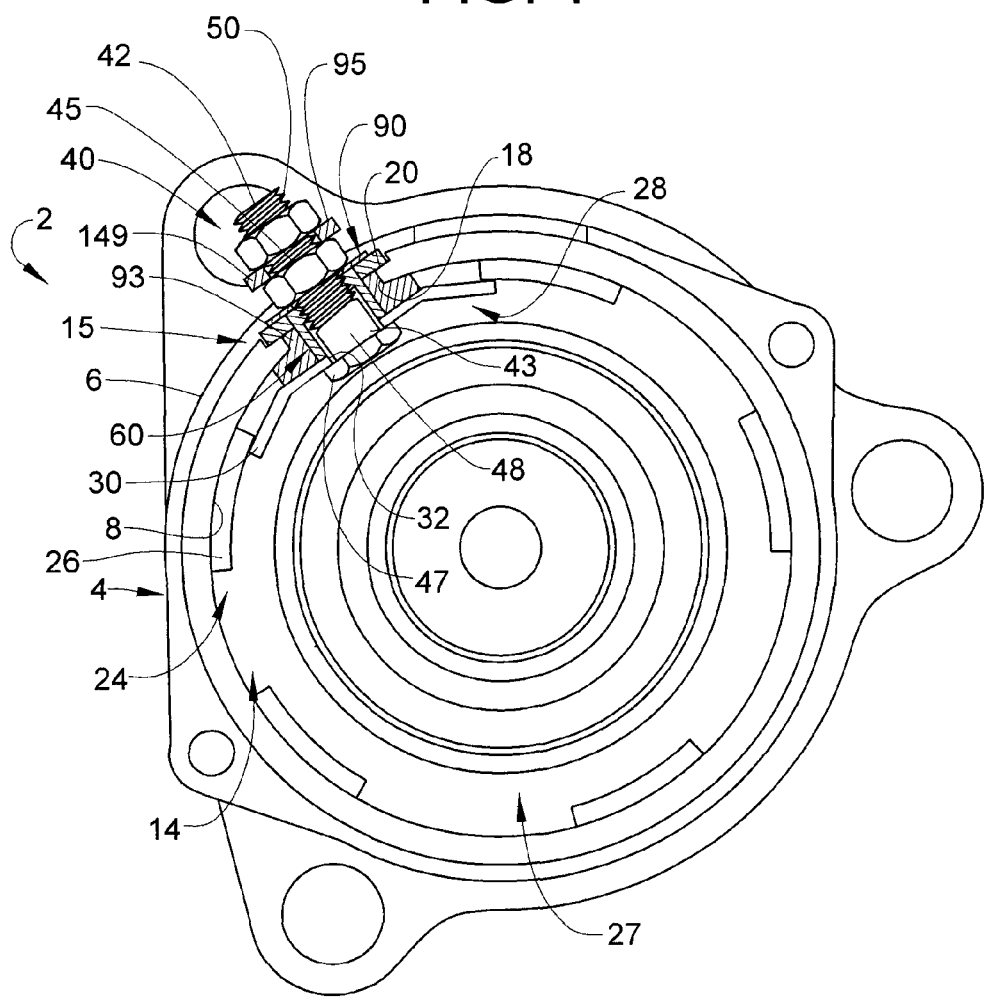
FIG. 1 depicts a cross-sectional view of a starter motor including a conductor mounting element in accordance with an exemplary embodiment.

A starter motor in accordance with an exemplary embodiment is indicated generally at 2 in FIG. 1. Starter motor 2 includes a frame 4 having an outer surface 6 and an inner surface 8 that defines an interior portion 14. Frame 4 includes a terminal mounting portion 15 defined by an opening 18 that extends from outer surface 6 to inner surface 8. Opening 18 is surrounded by a recessed zone 20 formed in outer surface 6. Starter motor 2 is shown to include a wired field 24 formed from a plurality of interconnected field coils, one of which is indicated at 26, fixedly mounted relative in inner surface 8 of frame 4. Starter motor 2 is also shown to include an armature 27 rotatably supported relative to wired field 24. Wired field 24 includes an electrical conductor 28 that takes the form of a field coil strap 30. Field coil strap 30 includes a terminal mounting section 32 configured to receive a terminal 40 that delivers electrical energy to wired field 24. At this point it should be understood, that starter motor 2 could also be provided with a permanent magnet field.

Terminal 40 includes a first end section 42 that extends to a second end section 43 through an intermediate section 45. Second end section 43 includes a head portion 47 and a shoulder portion 48. A plurality of threads 50 extend from first end section 43 toward shoulder portion 48. In the exemplary embodiment shown, shoulder portion 48 is not threaded. Field coil strap 30 is secured to terminal 40 by a conductor mounting element 60 formed from an electrically conductive material. More specifically, in contrast to prior art arrangements that weld or braze the field coil strap to the terminal, the exemplary embodiment employs a threaded fastener as will become more fully evident below.

Figure 2:
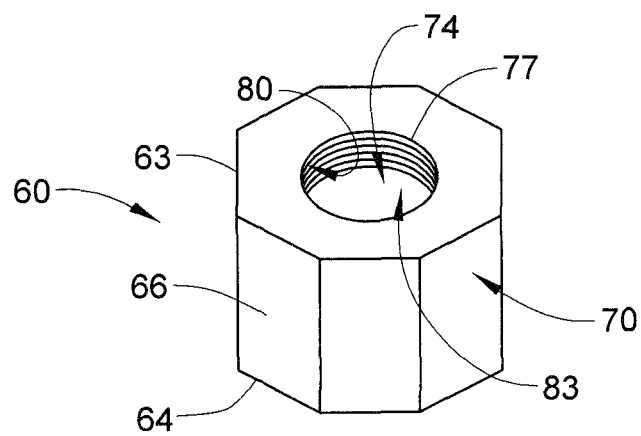
FIG. 2 depicts a perspective view of the conductor mounting element in accordance with the exemplary embodiment.
Figure 3:
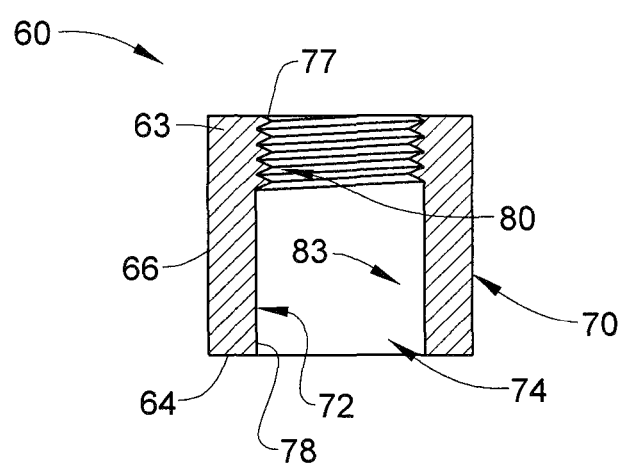
FIG. 3 depicts a cross-sectional view of the conductor mounting element in accordance with an exemplary embodiment.

As best shown in FIGS. 2-3 conductor mounting element 60 includes a first end 63 that extends to a second end 64 through an intermediate portion 66. Conductor mounting element 60 also includes an outer wall 70 and an inner wall 72 that defines a central passage 74. In the exemplary embodiment shown, outer wall 70 includes an anti-rotation element which, in the exemplary embodiment shown, takes the form of a generally hexagonal profile; however, it should be understood that outer wall 70 could take on a variety of shapes. Central passage 74 includes a first end portion 77 that extends to a second end portion 78. Central passage 74 is also shown to include a threaded zone 80 positioned adjacent first end portion 77 and a non-threaded zone 83 positioned adjacent second end portion 78. With this arrangement, conductor mounting element 60 provides greater stretch to terminal 40 to provide a spring clamping force that enhances bolted joint clamp length when tightened to a predetermined torque.

Figure 4:
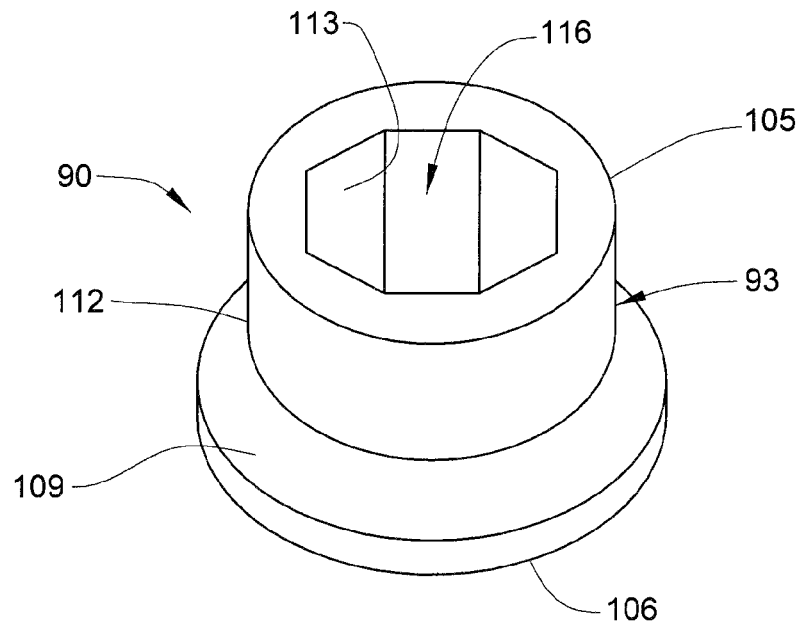
FIG. 4 depicts a perspective view of an insulator in accordance with an exemplary embodiment.

Conductor mounting element 60 is electrically isolated from frame 4 by an insulator assembly 90. Insulator assembly 90 includes a first insulating member 93 arranged within interior portion 10 and a second insulator member or washer 95 that is arranged on outer surface 6. As best shown in FIG. 4, first insulator member 93 includes a first end segment 105 that extends to a second end segment 106 having a tapered surface 109. As will become more fully evident below, tapered surface 109 conforms to a curvature of inner surface 8 of frame 4. First insulator member 93 also includes an outer wall section 112 and an inner wall section 113 that defines a conductor element receiving zone 116. Conductor element receiving zone 116 has an anti-rotation feature that, in the exemplary embodiment shown, takes the form of a generally hexagonal profile that is sized and shaped to receive conductor mounting element 60 as will be detailed more fully below. Of course, other anti-rotation features can also be employed.

Figure 5:
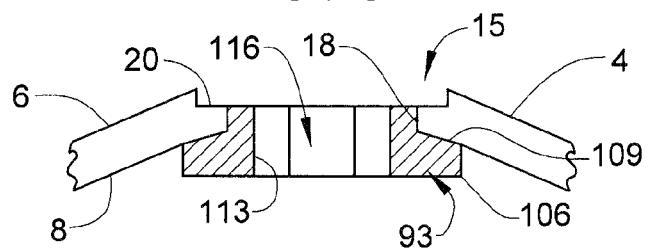
FIG. 5 depicts the insulator of FIG. 4 inserted into a frame of the starter motor of FIG. 1.
Figure 6:
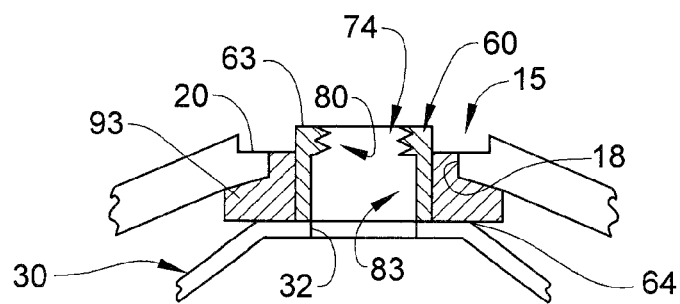
FIG. 6 depicts the conductor mounting element inserted into the insulator of FIG. 5.
Figure 7:
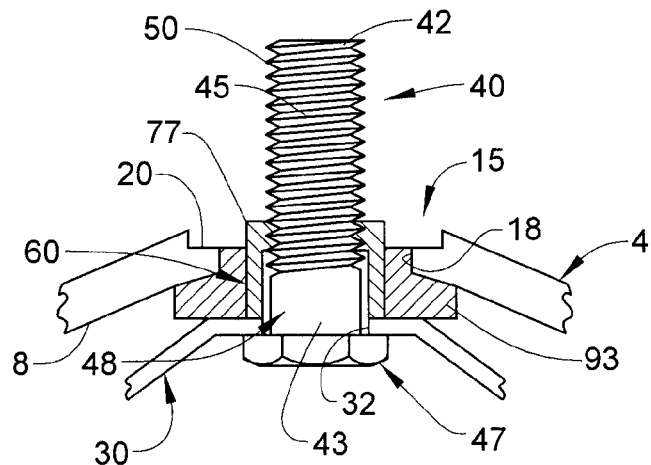
FIG. 7 depicts a terminal threaded into the conductor mounting element of FIG. 6.

Reference will now follow to FIGS. 5-9 in describing a method for securing field coil strap 30 to terminal 40, and for securing terminal 40 to frame 4. As shown in FIG. 5, first insulator member 93 is inserted and press-fit into opening 18. After installing first insulator member 93, conductor mounting element 60 is introduced into conductor mounting element receiving zone 116 and field coil strap 30 moved into position as shown in FIG. 6. Field coil strap 30 is positioned such that terminal mounting section 32 aligns or registers with central passage 74 of conductor mounting element 60. At this point, terminal 40 is passed through terminal mounting section 32 of field coil strap 30 into central passage 74 as shown in FIG. 7. Threads 50 are engaged with threaded zone 80 and terminal 40 is tightened to a desired torque. With this arrangement, conductor mounting element 60 forms a threaded clamped connection that establishes a solid metal compressive stack up between field coil strap 30 and terminal 40. The threaded clamped connection may be assembled and disassembled within geometric confines of frame 4.

Figure 8:
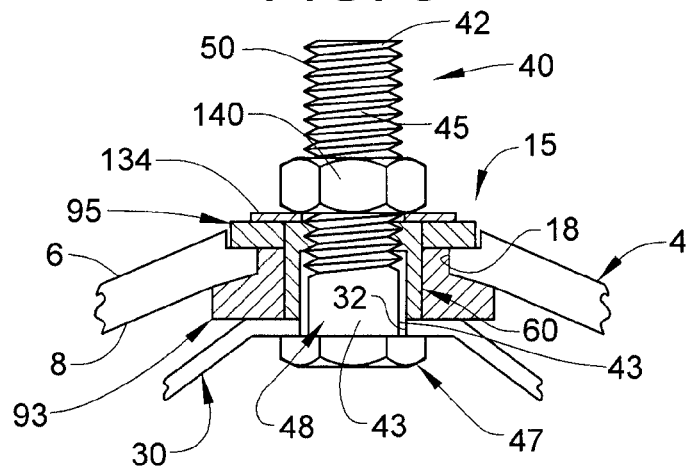
FIG. 8 depicts a mechanical fastener secured to the terminal of FIG. 7.
Figure 9:
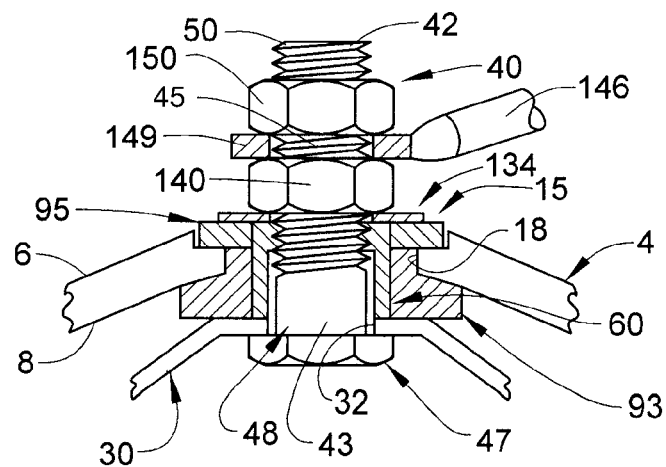
FIG. 9 depicts a conductor having a ring terminal secured to the terminal of FIG. 7.

After installing terminal 40, second insulator member 95 is positioned upon first insulator member 93 about first end 63 of conductor mounting element 60 and seated within recessed zone 20 as shown in FIG. 8. A washer 134 is placed over and seated upon second insulator member 95 and a mechanical fastener or torque nut 140 is engaged with threads 50 to secure terminal 40 to frame 4. Once terminal 40 is installed, a conductor 146 having a ring terminal 149 may be attached and secured with an additional mechanical fastener 150 as shown in FIG. 9. Conductor 146 may electrically connect starter motor 2 with a solenoid (not shown) mounted to frame 4.

At this point it should be understood that the exemplary embodiment provides a system for coupling a conductor to a terminal in a starter motor without the need for welding, soldering, or the like. More specifically, the exemplary embodiment provides a system for coupling a field coil strap to a terminal that extends through a frame of the starter motor without the need for welding or other operations that may cause damage to internal components. Starter motor designs are changing such that internal free space is being reduced. The reduction in internal free space makes protecting internal components from heat produced by welding or other such operations difficult. Moreover, existing systems simply do not provide enough physical space to allow for a reliable, low resistance and robust electrical connection.

The present invention provides for a system that creates a low resistance, robust electrical bond between the field coil strap and the terminal without the need to protect internal starter motor components from heat or the like. In this manner, the present invention can be employed in systems having limited space for established desired electrical connections. In addition to providing a desired electrical bond, the exemplary embodiments provide insulation both inside and outside of the frame that provides electrical isolation from ground. It should further be understood, that while the terminal has been shown and described as being connected to a wound field, the exemplary embodiments can also be incorporated into a stator motor having a permanent magnet field. In such a case, the terminal would be electrically connected to the armature through a brush assembly.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A starter motor comprising:
a frame including a terminal mounting portion;
a field fixedly mounted relative to the frame;
an armature rotatably supported relative to the field;
a conductor electrically connected to one of the field and the armature, the conductor having a terminal mounting section;
a terminal electrically connected to the one of the field and the armature, the terminal extending through the terminal mounting section of the conductor and the terminal mounting portion of the frame, the terminal including a plurality of threads; and
a conductor mounting element threadably engaged with the plurality of threads, the conductor mounting element being configured to form a threaded clamped connection that establishes a solid metal compressive stack up connection between the conductor and the terminal.

2. The starter motor according to claim 1, wherein the conductor mounting element includes a first end that extends to a second end through an intermediate portion, an outer wall, and an inner wall that extends from the first end to the second end defining a central passage, the inner wall including a threaded zone and a non-threaded zone.

3. The starter motor according to claim 2, further comprising: an insulator member extending about the conductor mounting element.

4. The starter motor according to claim 3, wherein the insulator member includes an outer wall section and an inner wall section that defines a conductor mounting element receiving zone.

5. The starter motor according to claim 4, wherein the conductor mounting element includes an anti-rotation element.

6. The starter motor according to claim 5, wherein the conductor element receiving zone includes an anti-rotation feature that cooperates with the anti-rotation element of the conductor mounting element.

7. The starter motor according to claim 3, wherein the insulator member is press-fit to the frame through the terminal mounting portion.

8. The starter motor according to claim 7, wherein the insulator member includes a first insulator member and a second insulator member, the first insulator member being arranged within the frame at the terminal mounting portion and the second insulator member being arranged outside of the frame at the terminal mounting portion.

9. The starter motor according to claim 1, wherein the conductor mounting element is formed from an electrically conductive material.

10. The starter motor according to claim 1, wherein the at least one electrical conductor comprises a field coil strap.

\* \* \* \* \*